(12) United States Patent
Tsuzuki et al.

(10) Patent No.: US 8,161,043 B2
(45) Date of Patent: Apr. 17, 2012

(54) INTERACTIVE PROGRAM SEARCH APPARATUS

(75) Inventors: Takashi Tsuzuki, Osaka (JP); Satoshi Matsuura, Kyoto (JP)

(73) Assignee: Panasonic Corporation, Osaka (JP)

( * ) Notice: Subject to any disclaimer, the term of this patent is extended or adjusted under 35 U.S.C. 154(b) by 314 days.

(21) Appl. No.: 12/594,287

(22) PCT Filed: Feb. 18, 2009

(86) PCT No.: PCT/JP2009/000658
§ 371 (c)(1),
(2), (4) Date: Oct. 1, 2009

(87) PCT Pub. No.: WO2009/104387
PCT Pub. Date: Aug. 27, 2009

(65) Prior Publication Data
US 2010/0114884 A1 May 6, 2010

(30) Foreign Application Priority Data

Feb. 20, 2008 (JP) .................................. 2008-039446

(51) Int. Cl.
*G06F 7/00* (2006.01)
*G06F 17/30* (2006.01)
(52) U.S. Cl. ........................................ 707/730; 707/736
(58) Field of Classification Search .................. None
See application file for complete search history.

(56) References Cited

U.S. PATENT DOCUMENTS

| 2003/0106058 | A1  | 6/2003 | Zimmerman et al. |
| 2003/0140309 | A1* | 7/2003 | Saito et al. ............... 715/500 |
| 2006/0167918 | A1  | 7/2006 | Tsuzuki et al. |
| 2006/0206471 | A1  | 9/2006 | Tsuzuki et al. |
| 2011/0113047 | A1* | 5/2011 | Guardalben ............... 707/754 |

FOREIGN PATENT DOCUMENTS

| JP | 9-73453     | 3/1997  |
| JP | 10-334106   | 12/1998 |
| JP | 11-31156    | 2/1999  |
| JP | 2002-92032  | 3/2002  |
| JP | 2002-196928 | 7/2002  |
| JP | 2004-21763  | 1/2004  |
| JP | 2005-27043  | 1/2005  |
| JP | 2007-183765 | 7/2007  |
| WO | 03/047242   | 6/2003  |
| WO | 2006/046390 | 5/2006  |

\* cited by examiner

*Primary Examiner* — Jay Morrison
(74) *Attorney, Agent, or Firm* — Wenderoth, Lind & Ponack, L.L.P.

(57) ABSTRACT

In an interactive program search apparatus (100) which presents search condition candidates for expanding or narrowing down search results, reason words indicating the reason why the search condition candidates are presented are adaptively determined based on user's preference, search actions, and watching actions. An association-source word extracting unit (109) extracts an association-source word from the program search results, and an associated word extracting unit (110) extracts associated words associated with the association-source word, from an association dictionary storage unit (103). A reason word extracting unit (111) extracts reason words illustrating the relationships between the association-source word and the associated words, using the association-source word, the associated words, and the obtainment history information composed of words included in the program information of the programs selected by the user in the past and selected words among the words.

10 Claims, 14 Drawing Sheets

FIG. 2

| Program ID | Metadata → Program information | | | | | |
|---|---|---|---|---|---|---|
| | Broadcasting date and time | Broadcast starting time | Program name | Genre | Cast name | Program contents |
| 01 | 8/22/2006 | 12:00 | Taro Matsushita hour | Variety | Taro Matsushita, Saburo Matsushita | Taro Matsushita invites well-known Japanese guests and has talks. |
| 02 | 8/22/2006 | 13:00 | The Japanese island around noon | Information | Hanako Matsushita, Jiro Matsushita | Live relay broadcast from places in the Japanese island |
| 03 | 8/23/2006 | 16:00 | Trust Jiro Matsushita | Variety | Jiro Matsushita, Shiro Matsushita | Jiro Matsushita responds to consultation by viewers. Health information included. |
| .. | .. | .. | .. | .. | .. | .. |

| Words included in metadata |
|---|
| Taro Matsushita, Variety, Saburo Matsushita, Japan, Guest, Talk |
| Japan, Japanese island, Information, Hanako Matsushita, Jiro Matsushita |
| Jiro Matsushita, Variety, Shiro Matsushita, Consultation, Health, Information, Health information |

FIG. 3

| Related word 1 | Related word 2 | Degree of relevance |
|---|---|---|
| : | : | : |
| Taro Matsushita | Variety | 60 |
| Taro Matsushita | Saburo Matsushita | 20 |
| Taro Matsushita | Japan | 30 |
| Taro Matsushita | Talk | 70 |
| : | : | : |
| Taro Matsushita | Jiro Matsushita | 80 |
| Taro Matsushita | Variety | 70 |
| : | : | : |
| Saburo Matsushita | Variety | 40 |
| : | : | : |
| Variety | Talk | 80 |
| : | : | : |

Association dictionary

FIG. 4

| Word | Selection frequency |
|---|---|
| Taro Matsushita | 5 |
| Variety | 20 |
| Saburo Matsushita | 3 |
| Japan | 6 |
| Guest | 15 |
| Talk | 10 |
| The Japanese island | 2 |
| : | : |

Obtainment history information

FIG. 5

Program information of search result programs

| Preferential order of search results | Program ID | Metadata ||||||
|---|---|---|---|---|---|---|---|
| | | Broadcasting date and time | Broadcast starting time | Program name | Genre | Cast name | Program contents |
| 1 | 01 | 8/22/2006 | 12:00 | Taro Matsushita hour | Variety | Taro Matsushita, Saburo Matsushita | Taro Matsushita invites well-known Japanese guests and has talks. |
| 2 | 03 | 8/23/2006 | 16:00 | Trust Jiro Matsushita | Variety | Jiro Matsushita, Shiro Matsushita | Jiro Matsushita responds to consultation by viewers. Health information included. |
| 3 | 06 | 8/22/2006 | 13:00 | Saburo Matsushita's room | Talk | Saburo Matsushita, Jiro Matsushita | Jiro Matsushita in the limelight is invited, and his attraction is featured. |
| .. | .. | .. | .. | .. | .. | .. | .. |

| Words included in metadata |
|---|
| Taro Matsushita, Variety, Saburo Matsushita, Japan, Guest, Talk |
| Jiro Matsushita, Variety, Shiro Matsushita, Consultation, Health, Information, Health information |
| Saburo Matsushita, Talk, Jiro Matsushita |

FIG. 6

| | | Search results (100 results) | |
|---|---|---|---|
| 1 | ▨ | Taro Matsushita hour | 8/22/2006 |
| | | Taro Matsushita invites well-known Japanese guests and has talks. | |
| 2 | ▨ | Trust Jiro Matsushita | 8/23/2006 |
| | | Taro Matsushita responds to consultation by viewers. Health information included. | |
| 3 | ▨ | Saburo Matsushita's room | 8/22/2006 |
| | | Jiro Matsushita in the limelight is invited, and his attraction is featured. | |

FIG. 8

Obtainment history information

| Word | Selection frequency |
|---|---|
| Taro Matsushita | 4 |
| Variety | 20 |
| Saburo Matsushita | 3 |
| Japan | 6 |
| Guest | 15 |
| Talk | 10 |
| The Japanese island | 2 |
| : | : |

FIG. 9

Provisionally selected search vector

| Word | Selection frequency |
|---|---|
| Taro Matsushita | 6 |
| Variety | 21 |
| Saburo Matsushita | 4 |
| Japan | 7 |
| Guest | 16 |
| Talk | 11 |
| The Japanese island | 2 |
| : | : |

FIG. 10

Program information of provisionally selected search result

| Preferential order of search results | Program ID | Metadata | | | | | |
|---|---|---|---|---|---|---|---|
| | | Broadcasting date and time | Broadcast starting time | Program name | Genre | Cast name | Program contents |
| 1 | 01 | 8/22/2006 | 12:00 | Taro Matsushita hour | Variety | Taro Matsushita, Saburo Matsushita | Taro Matsushita invites well-known Japanese guests and has talks. |
| 2 | 10 | 8/23/2006 | 12:00 | Taro Matsushita hour | Variety | Taro Matsushita, Goro Matsushita | Taro Matsushita plays match games with children at places in Japan. |
| 3 | 03 | 8/23/2006 | 16:00 | Trust Jiro Matsushita | Variety | Jiro Matsushita, Shiro Matsushita | Jiro Matsushita responds to consultation by viewers. Health information included. |
| : | : | : | : | : | : | : | : |

| Words included in metadata |
|---|
| Taro Matsushita, Variety, Saburo Matsushita, Japan, Guest, Talk |
| Taro Matsushita, Goro Matsushita, Japan, Game |
| Jiro Matsushita, Variety, Shiro Matsushita, Consultation, Health, Information, Health information |

FIG. 11

| | Search results (100 results) | |
|---|---|---|
| 1 | Taro Matsushita hour<br>Taro Matsushita invites well-known Japanese guests and has talks. | 8/22/2006 |
| 2 | Trust Jiro Matsushita<br>Taro Matsushita responds to consultation by viewers. Health information included. | 8/23/2006 |
| 3 | Saburo Matsushita's room<br>Jiro Matsushita in the limelight is invited, and his attraction is featured. | 8/22/2006 |

| Related words |
|---|
| "Taro Matsushita" (associated with "Talk") |
| "Jiro Matsushita" (associated with "Health") |

FIG. 12

| | Search results (100 results) | | |
|---|---|---|---|
| 1 | Taro Matsushita hour | 8/22/2006 | Taro Matsushita invites well-known Japanese guests and has talks. |
| 2 | Trust Jiro Matsushita | 8/23/2006 | Taro Matsushita responds to consultation by viewers. Health information included. |
| 3 | Saburo Matsushita's room | 8/22/2006 | Jiro Matsushita in the limelight is invited, and his attraction is featured. |

| Related words |
|---|
| "Taro Matsushita" (associated with "Talk", "Guest", and "Comedy program") |
| "Jiro Matsushita" (associated with "Health", "Information", and "Variety show") |

FIG. 13

| Word | Selection frequency |
|---|---|
| Taro Matsushita | 6 |
| Variety | 21 |
| Saburo Matsushita | 4 |
| Japan | 7 |
| Guest | 16 |
| Talk | 11 |
| The Japanese island | 2 |
| ⋮ | ⋮ |

Obtainment history information

FIG. 14

| | Input word | Information | |
|---|---|---|---|
| | Search results (100 results) | | |
| 1 | | Taro Matsushita hour | 8/22/2006 |
| | | Taro Matsushita invites well-known Japanese guests and has talks. | |
| 2 | | Trust Jiro Matsushita | 8/23/2006 |
| | | Taro Matsushita responds to consultation by viewers. Health information included. | |
| 3 | | Saburo Matsushita's room | 8/22/2006 |
| | | Jiro Matsushita in the limelight is invited, and his attraction is featured. | |

| Related words |
|---|
| "Taro Matsushita" |
| "Jiro Matsushita" |

INTERACTIVE PROGRAM SEARCH APPARATUS

TECHNICAL FIELD

The present invention relates to an interactive program search apparatus which searches out a desired program by means that a user repeatedly selects a word presented in association with a searched-out program.

BACKGROUND ART

Conventionally, related word presentation apparatuses have been proposed. Such related word presentation apparatuses are intended to present, as a search condition, a related word having a high degree of relevance with an aim to prevent omission in search, for example, in the case where the number of search results is small or other cases at the time of displaying search results obtained based on a previous search condition inputted by the user (for example, see Patent Reference 1). With this related word presentation apparatus, the user selects one of the presented related words in order to obtain new search results in addition to the search results obtained based on the first search condition. The related word presentation apparatus logically connects the selected related word and the search condition (connects the both by taking a logical sum of the related word and the search condition), and performs a search according to the logically connected search condition. Here, the related word presented by the user is a related word closely related to the search condition inputted by the user, and thus the user can gradually increase the number of search results based on the firstly obtained search results.

In addition, text mining programs have been proposed. Such text mining programs are intended to present information indicating an intervening word which is associated with two words inputted by a user (for example, see Patent Reference 2).

Patent Reference 1: Japanese Unexamined Patent Application Publication No. 10-334106
Patent Reference 2: Japanese Unexamined Patent Application Publication No. 2004-21763
Disclosure of Invention
Problems that Invention is to Solve However, a conventional related word presentation apparatus merely presents a related word according to a search condition, and cannot present a user the reason why the related word is presented according to the search condition. In this case, if the user cannot understand the relationship between the related word and the search condition, a user's selection of a related word causes a problem that currently obtained search results are totally different from the search results obtained according to a search condition. In a similar case, the user thinks that the related word presented by the related word presentation apparatus is obtained by mistake, and thus a problem arises that the user has difficulty in selecting a related word whose relationship with the search condition cannot be understood. FIG. 14 is a diagram showing an example of a conventional display of search results and related words. FIG. 14 shows an exemplary presentation in the case where the user firstly inputs a search condition of "Information" for the purpose of searching out a program related to health information. The presentation includes (i) the search results, and (ii) "Taro Matsushita" who appears in a talk and information program and "Jiro Matsushita" who appears in a health and information program as related words according to the search condition "Information". At this time, in the case where the user attempts to perform further search by selecting one of the presented related words, the user should select the related word "Jiro Matsushita" for the purpose of searching out a health information program. However, since there is no presentation of "Health and Information" indicating the relationship between the search condition "Information" and the related word "Jiro Matsushita", the user has difficulty in making a right selection from among the related words "Taro Matsushita" and "Jiro Matsushita".

In addition, the conventional text mining program merely presents a route word which is associated with two words inputted by the user, and thus the route word is selected without reflecting the search condition inputted by the user, the obtained search results, and the user's preference. For this reason, there are a case where the user does not know the presented route word and a case where the word presented to the user is a word having a little relationship with the inputted search condition and the obtained search result. The problem is that the user cannot understand the relationship between the two words.

The search condition is not limited to a search condition inputted by the user, and the search condition may be automatically extracted from program information and the like. The same problem arises even in the latter case.

The present invention has been made in view of the aforementioned circumstances, and aims to provide an interactive program search apparatus and an interactive program search method which allow the user to easily understand the relationship between the obtained search conditions and the presented related words.

Means to Solve the Problems

In order to achieve the above-described objects, an interactive program search apparatus which searches out a program using a search word includes: a program information storage unit configured to store program information indicating contents of programs on a per program basis; an association dictionary storage unit configured to store an association dictionary in which words included in the program information are stored in association with each other; an obtaining unit configured to obtain the search word; an obtainment history storage unit configured to store, as obtainment history information, the search word obtained by the obtaining unit and an obtainment frequency of the search word; a program search unit configured to search out programs from the program information using, as a search condition, the search word included in the obtainment history information; an association-source word extracting unit configured to extract an association-source word which is associated with an associated word, from among the words included in the obtainment history information; an associated word extracting unit configured to extract the associated word associated with the association-source word using the association dictionary; a reason word extracting unit configured to extract, as a reason word indicating a relationship between the association-source word and the associated word, a word included in the obtainment history information from among words each having (i) a degree of relevance equal to or greater than a predetermined degree of relevance with the association-source word and (ii) a degree of relevance equal to or greater than a predetermined degree of relevance with the associated word; and a display unit configured to display program search results which are the programs searched out by the program search unit, the associated word, and the reason word.

This configuration allows obtainment history information related to (i) the search word inputted by the user or obtained from program information and (ii) the program information of the program selectively determined by the user to be reflected on a reason word indicating the relationship between the search condition and the associated word associated with the search condition. The obtainment history information is composed of words known by the user, and thus the user can understand the meaning of the reason word and easily understand the relationship between the inputted search condition and the displayed related word.

It is to be noted that the present invention can be implemented as an interactive program search apparatus including such unique processing units, but also as an interactive program search method including steps corresponding to the unique units included in the interactive program search apparatus and as a program causing a computer to execute the unique steps included in the interactive program search method. As a matter of course, such program can be distributed by means of recording media such as CD-ROMs (Compact Disc-Read Only Memory) and communication networks such as the Internet.

Effects of the Invention

As described above, the interactive program search apparatus according to the present invention (I) allows obtainment history information related to (i) the search word inputted by the user or obtained from program information and (ii) the program information of the program selectively determined by the user to be reflected on a reason word indicating the relationship between the search condition and the associated word associated with the search condition, and (II) allows presentation of the reason word to the user. Therefore, the user looking at a known or understandable reason word can easily understand the relationship between the search condition and the related word.

BRIEF DESCRIPTION OF DRAWINGS

FIG. 2 is a diagram showing an example of contents of program information stored in a program information storage unit in the Embodiment of the present invention.

FIG. 3 is a diagram showing an example of contents of association dictionary stored in an association dictionary storage unit in the Embodiment of the present invention.

FIG. 4 is a diagram showing an example of contents of obtainment history information stored in an obtainment history storage unit in the Embodiment of the present invention.

FIG. 5 is a diagram showing an example of contents of program information of a search result program in the Embodiment of the present invention.

FIG. 6 is a diagram showing an example of contents displayed on a display unit in the Embodiment of the present invention.

FIG. 8 is a diagram showing an example of contents of obtainment history information stored in the obtainment history storage unit in the Embodiment of the present invention.

FIG. 9 is a diagram showing an example of contents of a provisionally selected search vector in the embodiment of the present invention.

FIG. 10 is a diagram showing an example of contents of program information obtained as results of provisional selection search in the Embodiment of the present invention.

FIG. 11 is a diagram showing an example of contents displayed on the display unit in the Embodiment of the present invention.

FIG. 12 is a diagram showing an example of contents displayed on the display unit in the Embodiment of the present invention.

FIG. 13 is a diagram showing an example of contents of obtainment history information stored in the obtainment history storage unit in the Embodiment of the present invention.

FIG. 14 is a diagram showing an example of a conventional display of search results and related words.

NUMERICAL REFERENCES

Figure 1:
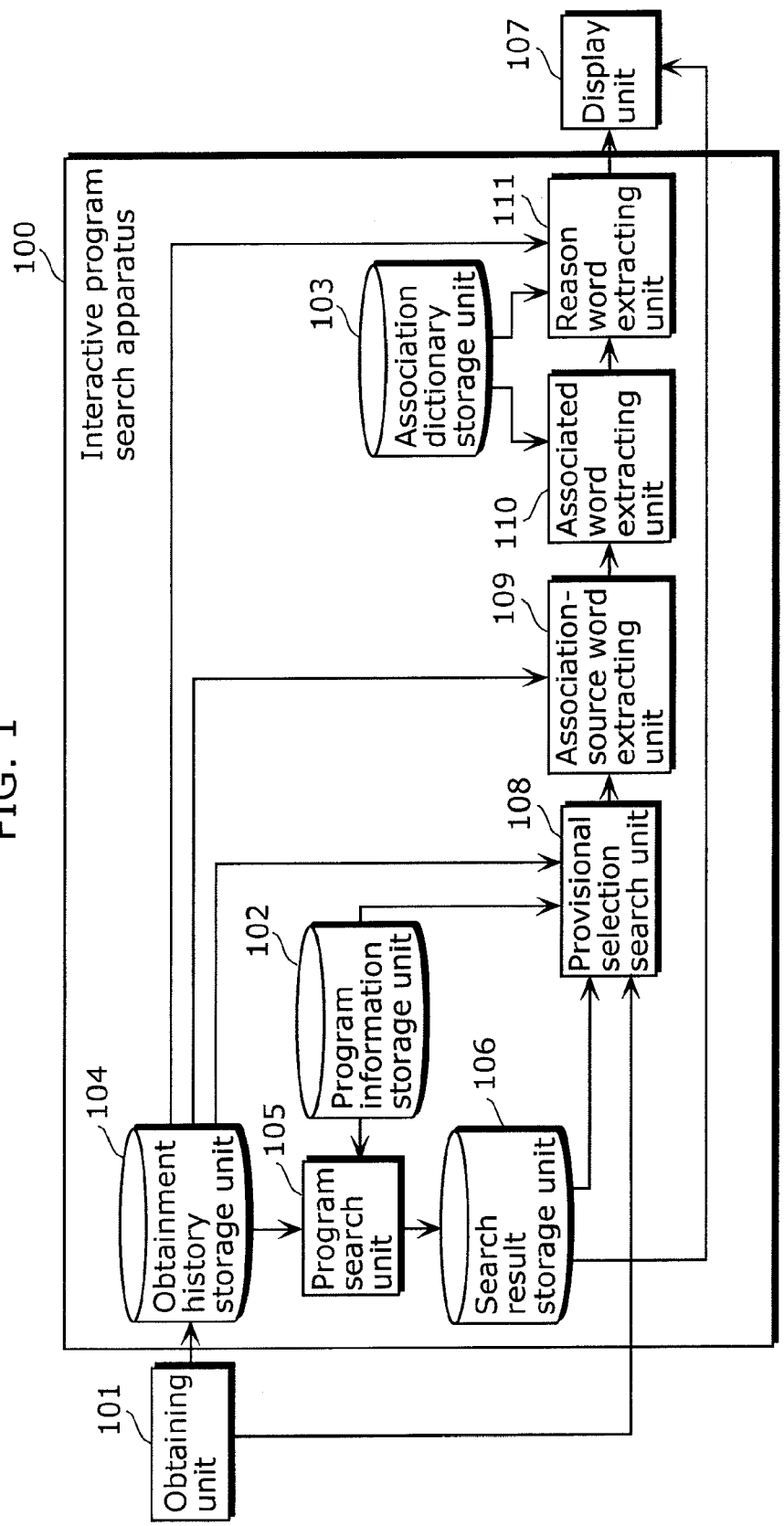
FIG. 1 is a structural diagram of an interactive program search apparatus according to an Embodiment of the present invention.

100 Interactive program search apparatus
101 Obtaining unit
102 Program information storage unit
103 Association dictionary storage unit
104 Obtainment history storage unit
105 Program search unit
106 Search result storage unit
107 Display unit
108 Provisional selection search unit
109 Association-source word extracting unit
110 Associated word extracting unit
111 Reason word extracting unit

BEST MODE FOR CARRYING OUT THE INVENITON

An interactive program search apparatus according to an Embodiment of the present invention will be described below with reference to the drawings.

FIG. 1 is a structural diagram of an interactive program search apparatus according to the Embodiment of the present invention.

The interactive program search apparatus 100 is an apparatus which presents a related word related to a program which is a search result and a reason word indicating the relationship between the search result program and the related word when displaying the search result. The interactive program search apparatus 100 includes, an obtaining unit 101, a program information storage unit 102, an association dictionary storage unit 103, an obtainment history storage unit 104, a program search unit 105, a search result storage unit 106, a display unit 107, a provisional selection search unit 108, an association-source word extracting unit 109, an associated word extracting unit 110, and a reason word extracting unit 111.

The obtaining unit 101 is a processing unit which is configured with, for example, an input device such as keyboards, a mouse, and a remote controller. The obtaining unit 101 receives an input of a program name and a selection of a search word from a user to obtain the program name and the search word.

The program information storage unit 102 stores, for each of programs, a "Program ID" which is the identifier of the program, "Metadata" which is information of the program, and "Words included in metadata".

FIG. 2 is a diagram showing an exemplary program information stored in the program information storage unit 102. As shown in FIG. 2, the program information storage unit 102 stores, for each program, the "Program ID" which is the program identifier identifying the program, the "Metadata", and the "Words included in metadata" in association with each other. The "Metadata" includes "Broadcasting date and time" which is the date and time at which the program is broadcast, "Broadcast starting time" which is the starting time of the program, "Program name", "Genre" of the program, "Cast name" which is the names of cast of the program, and "Program contents" illustrating the contents of the program. More specifically, the program information storage unit 102 stores, as "Program ID, Broadcasting date and time, Broadcast starting time, Program name, Genre, Cast name, Program contents, Words included in metadata", the following: "01, Aug. 22, 2006, 12:00, Taro Matsushita hour, Variety, Taro Matsushita, Saburo Matsushita, Taro Matsushita invites well-known Japanese guests and has talks, Taro Matsushita, Variety, Saburo Matsushita, Japan, Guest, Talk"; "02, Aug. 22, 2006, 13:00, The Japanese island around noon, Information, Hanako Matsushita, Jiro Matsushita, Live relay broadcast from places in the Japanese island, Japan, the Japanese island, Information, Hanako Matsushita, Jiro Matsushita"; "03, Aug. 23, 2006, 16:00, Trust Jiro Matsushita, Variety, Jiro Matsushita, Shiro Matsushita, Jiro Matsushita responds to consultation by viewers, Health information included, Jiro Matsushita, Variety, Shiro Matsushita, Consultation, Health, Information, Health information". Here, "Words included in metadata" may be extracted from "Metadata" using a morpheme analysis technique or a unique expression extraction technique.

The association dictionary storage unit 103 stores an association dictionary indicating the association and the degree of relevance between the "Words included in metadata" stored in the program information storage unit 102. Methods for calculating the degree of relevance between the words include a method using the mutual information of the words. In other words, words which co-occur in a segment, for example, in a program included in program information or generally in a sentence or a paragraph in text are associated with each other using mutual information or the like. At this time, for example, in the case where a word A and a word B frequently co-occur in a program, the degree of relevance between the word A and the word B is great. In addition, in the case where the word B frequently appears both in programs in which the word A appears and programs in which the word A does not appear, the degree of relevance is small. In other words, a high degree of relevance between words shows that the words frequently co-occur in programs. In addition to the method using such mutual information, examples of general methods for calculating the degree of relevance include methods using a dice-coefficient, a weighted dice-coefficient, a t-score, an $\chi$-square value, or a log likelihood ratio.

FIG. 3 is a diagram showing an exemplary association dictionary in which, for example, words co-occurring in a program are stored in association with each other. For example, as shown in FIG. 3, the association dictionary storage unit 103 stores, as "Word, Word, The degree of relevance", "Taro Matsushita, Variety, 60", "Taro Matsushita, Saburo Matsushita, 20", "Taro Matsushita, Japan, 30", . . . "Taro Matsushita, Jiro Matsushita, 80", "Jiro Matsushita, Variety, 70" . . . .

The obtainment history storage unit 104 stores, as obtainment history information, a search word inputted by the user and program information of the program selectively determined by the user.

FIG. 4 is a diagram showing an exemplary obtainment history information which includes, for example, a word and a selection frequency of a program including the word in association with each other, and is stored. For example, as shown in FIG. 4, the obtainment history storage unit 104 stores, as "Word, Selection frequency", "Taro Matsushita, 5", "Variety, 20", "Saburo Matsushita, 3", "Japan, 6", "Guest, 15", "Talk, 20", "the Japanese island, 2", . . . . Here, "Taro Matsushita, 5" stored as "Word, Selection frequency" means the number of times by which the user has thought of "Taro Matsushita". For example, the number of times is a value obtained by adding the selection frequency by which the user has selected "Taro Matsushita" as a search word and the watching frequency by which the user has watched the program including the program contents in which the word "Taro Matsushita" appears.

The program search unit 105 searches, for a program, the program information stored in the program information storage unit 102 using the obtainment history information stored in the obtainment history storage unit 104, and determines the searched-out program to be a program as the search result.

The search result storage unit 106 stores the program information of the search result program outputted by the program search unit 105.

FIG. 5 is a diagram showing an exemplary program information of search result programs stored in the search result storage unit 106. For example, as shown in FIG. 5, the search result storage unit 106 stores, for each program, "Preferential order of search result", "Program ID", "Metadata", and "Words included in metadata" in association with each other. The "Metadata" includes "Broadcasting date and time", "Broadcast starting time", "Program name", "Genre", "Cast name", and "Program contents". For example, "1, 01, Aug. 22, 2006, 12:00, Taro Matsushita hour, Variety, Taro Matsushita, Saburo Matsushita, Taro Matsushita invites well-known Japanese guests and has talks, Taro Matsushita, Variety, Saburo Matsushita, Japan, Guest, Talk" are stored as the "Preferential order of search result, Program ID, Broadcasting date and time, Broadcast starting time, Program name, Genre, Cast name, Program contents, and Words included in metadata".

The display unit 107 presents the user the program information of the search result program stored in the search result storage unit 106, an associated word of the search result program extracted by the associated word extracting unit 110, and a reason word extracted by the reason word extracting unit 111. This display unit 107 is configured to include a display device such as a CRT (Cathode-Ray Tube) display, a liquid crystal display (LCD), and a plasma display (PDP).

The provisional selection search unit 108 obtains program information of a provisionally selected program in the case where the user has focused on and selected the provisionally selected program from among the search result programs displayed on the display unit 107 as shown in FIG. 6 using the obtaining unit 101. Subsequently, the provisional selection search unit 108 searches, for a program, the program information stored in the program information storage unit 102 using the obtainment history information stored in the obtainment history storage unit 104 and the program information of the provisionally selected program, and determines the searched-out program to be the result of provisional selection search.

The association-source word extracting unit 109 extracts, as an association-source word, the word having the highest selection frequency, from among the words included in the program information of the provisionally selected program using the obtainment history information stored in the obtainment history storage unit 104. In other words, the association-source word extracted by the association-source word extracting unit 109 is a word which is associated with an associated word related to the search word, and the association-source word extracting unit 109 extracts this association-source word from among the words included in the obtainment history information.

The associated word extracting unit 110 extracts, as an associated word, a word having a degree of relevance equal to or greater than a predetermined threshold value with the association-source word extracted by the association-source word extracting unit 109 in the association dictionary stored in the association dictionary storage unit 103, from among the words included in the program information of the result of provisional selection search searched out by the provisional selection search unit 108.

The reason word extracting unit 111 extracts a word from the association dictionary stored in the association dictionary storage unit 103 using the association-source word extracted by the association-source word extracting unit 109, the associated word extracted by the associated word extracting unit 110, and the obtainment history information stored in the obtainment history storage unit 104, and determines the extracted word to be a reason word indicating the relationship between the association-source word and the associated word.

Figure 7A:
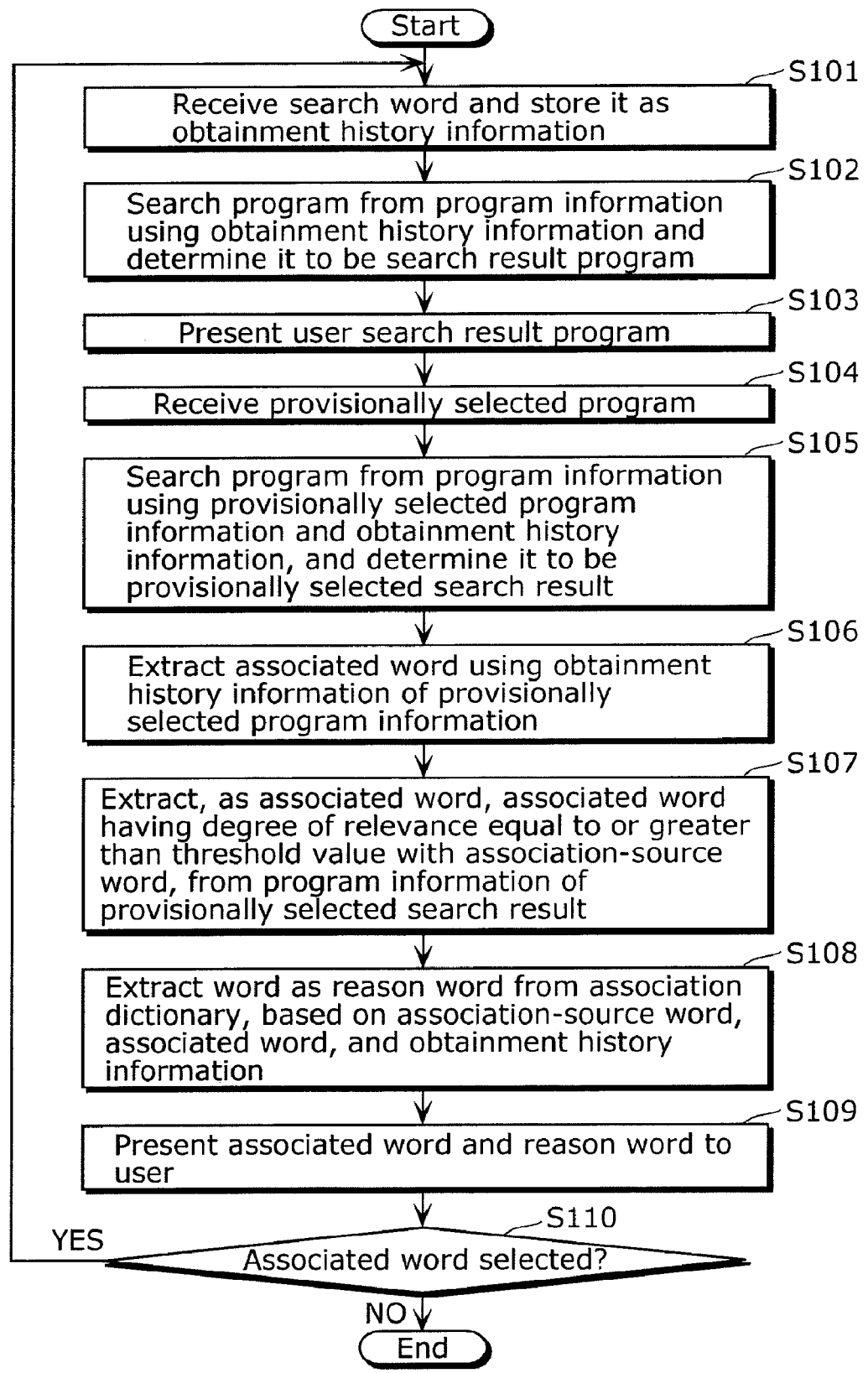
FIG. 7A is a flowchart indicating operations of the interactive program search apparatus in the Embodiment of the present invention.
Figure 7B:
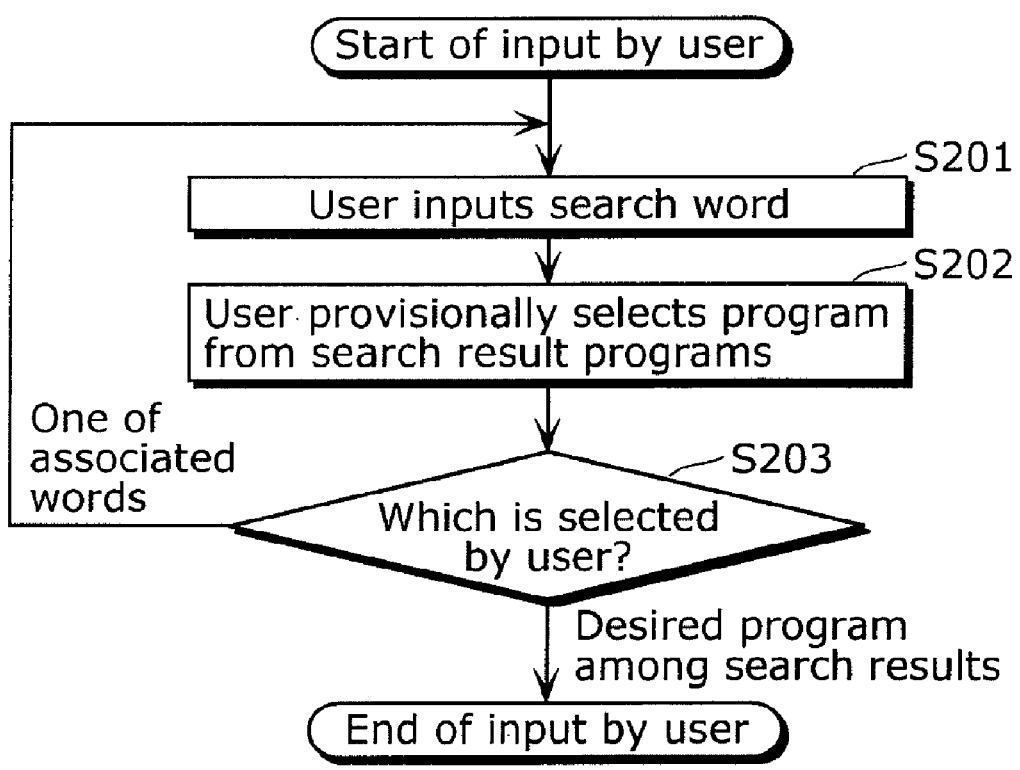
FIG. 7B is a flowchart indicating a user input process in the Embodiment of the present invention.

With reference to flowcharts of FIGS. 7A and 7B, a description is given of exemplary operations of the interactive program search apparatus according to this embodiment configured like this. FIG. 7A is a flowchart illustrating operations of the interactive program search apparatus 100. FIG. 7B is a flowchart illustrating an input by the user.

In the case where the user inputs a search word through the obtaining unit 101 (Step S201 in FIG. 7B) and the search word is not included in the obtainment history information stored in the obtainment history storage unit 104, a search word is added to the obtainment history information. On the other hand, in the case where the search word has already been stored as the obtainment history information in the obtainment history storage unit 104, 1 is added to the value of selection frequency of the search word (Step S101 in FIG. 7A). As a specific example, the user inputs the search word "Taro Matsushita" through the obtaining unit 101. In the case where the search word "Taro Matsushita" is not included in the obtainment history information stored in the obtainment history storage unit 104, "Taro Matsushita, 1" as "Word, Selection frequency" is newly added to the obtainment history information. On the other hand, in the case where the search word "Taro Matsushita" has already been stored as the obtainment history information in the obtainment history storage unit 104, the obtainment history information is updated by adding 1 to the value of selection frequency of the search word "Taro Matsushita". As an example, FIG. 8 shows obtainment history information before the update in the case where the word "Taro Matsushita" is inputted, and FIG. 4 shows obtainment history information after the update. The selection frequency of the word "Taro Matsushita" is "4" in the obtainment history information before the update shown in FIG. 8. After the update, the selection frequency is "5" in the obtainment history information shown in FIG. 4.

The program search unit 105 searches, for a program, the program information stored in the program information storage unit 102 using the obtainment history information stored in the obtainment history storage unit 104, and determines the searched-out program to be the search result program (Step S102). In the above example, as a method for searching out a program, the program search unit 105 obtains, for each program, the selection frequencies of the respective words included in the metadata, sums the selection frequencies, and determines the summed value to be a score of the program in order to search out a program which satisfies the search condition inputted by the user by the time or is similar to the program selected by the user. Subsequently, the program search unit 105 rearranges the programs according to the preferential order of the scores, and determines the programs each having a score equal to or greater than the predetermined threshold value to be the search result programs. As an example, as shown in FIG. 2, the score of the program with the program ID 01 calculated using the obtainment history information shown in FIG. 4 is "59" obtained by adding: "5" which is the selection frequency of the word "Taro Matsushita", "20" which is the selection frequency of the word "Variety", "3" which is the selection frequency of the word "Saburo Matsushita", "6" which is the selection frequency of the word "Japan", "15" which is the selection frequency of the word "Guest", and "10" which is the selection frequency of the word "Talk". Likewise, the program search unit 105 calculates the scores of all the respective programs, and determines the programs each having a score equal to or greater than the predetermined threshold value to be the search result programs. FIG. 5 shows an example of search result programs stored in the search result storage unit 106.

The display unit 107 presents the user the program information of the search result programs stored in the search result storage unit 106 (Step S103). FIG. 6 shows an exemplary display presenting the user the search result programs shown in FIG. 5.

The provisional selection search unit 108 receives a program (Step S104) which has drawn attention of the user and has been provisionally selected (Step S202) from among the search result programs displayed on the display unit 107 using the obtaining unit 101.

The provisional selection search unit 108 obtains the program information of the provisionally selected program from the search result storage unit 106, searches, for programs, the program information stored in the program information storage unit 102 using the obtainment history information stored in the obtainment history storage unit 104 and the program information of the provisionally selected programs, and determines the searched-out programs as the results of provisional selection search (Step S105). In the above example, it is assumed that the user inputs, using the obtaining unit 101, the program number "1" indicating the provisionally selected program from among the search result programs displayed on the display unit 107 shown in FIG. 6. When the program number "1" is inputted through the obtaining unit, the provisional selection search unit 108 obtains, from the search result storage unit 106, "01, Aug. 22, 2006, 12:00, Taro Matsushita hour, Variety, Taro Matsushita, Saburo Matsushita, Taro Matsushita invites well-known Japanese guests and has talks, Taro Matsushita, Variety, Saburo Matsushita, Guest, Talk" which corresponds to "Program ID, Broadcasting date and time, Broadcast starting time, Program name, Genre, Cast name, Program contents, Words included in metadata" which is the program information of the program with the program ID "1". Next, the provisional selection search unit 108 determines the obtainment history information stored in the obtainment history storage unit 104 to be a provisionally selected search vector. In the case where the provisionally selected search vector does not include any word included in the metadata of the provisionally selected program, the provisional selection search unit 108 adds the search word to the provisionally selected search vector. In the case where the provisionally selected search vector includes each word included in the metadata of the provisionally selected program, the provisional selection search unit 108 adds 1 to the value of the selection frequency of the search word in the provisionally selected search vector. Here, FIG. 9 shows an exemplary provisionally selected search vector of the program with the program ID "01" generated in the case where the obtainment history information is the obtainment history information shown in FIG. 4 and the program with the program ID "01" is the provisionally selected program. Next, the provisional selection search unit 108 obtains, for each program, the selection frequencies of the respective words included in the metadata from the provisionally selected vector, sums the selection frequencies, and determines the summed value to be the score of the program. Lastly, the provisional selection search unit 108 rearranges the programs according to the preferential order of the programs, and determines the programs each having a selection frequency equal to or greater than the predetermined threshold value to be the results of provisional selection search. Here, FIG. 10 shows exemplary results of provisional selection search. In other words, the results of provisional selection search are considered to be the program search results obtained by reflecting the provisionally selected programs.

The association-source word extracting unit 109 extracts the word having the highest selection frequency as the association-source word, from among the words included in the program information of the provisionally selected program using the obtainment history information stored in the obtainment history storage unit 104 (Step S106). In the above example, the association-source word extracting unit 109 extracts, as the association-source word, the word "Variety" having the highest selection frequency in the obtainment history information shown in FIG. 4, from among the words included in the metadata of the provisionally selected program with the program ID "01". The obtainment history information reflects the user's interest. For this reason, the association-source word extracting unit 109 can determine the word which would have drawn the user's attention at most to be the association-source word from among the words included in the program information of the provisionally selected word.

The associated word extracting unit 110 extracts, an associated word, a word having a degree of relevance equal to or greater than the predetermined threshold value with the association-source word extracted by the association-source word extracting unit 109 in the association dictionary stored in the association dictionary storage unit 103, from among the words included in the program information of the results of provisional selection search searched out by the provisional selection search unit 108 (Step S107). In the above example, the associated word extracting unit 110 extracts, as the associated words, the words "Taro Matsushita" and "Jiro Matsushita" each having a degree of relevance equal to or greater than the predetermined threshold value (for example, "50") with the association-source word "Variety" extracted by the association-source word extracting unit 109 in the association dictionary stored in the association dictionary storage unit 103 shown in FIG. 3, from among the words included in the metadata of the programs which are the programs as the results of provisional selection search searched out by the provisional selection search unit 108 and assigned with the program IDs "01", "10", and "03", respectively. In other words, the word based on which the results of provisional selection search can be searched out should be included in the program information of the results of provisional selection search. For this reason, the associated word extracting unit 110 can determine, to be an associated word, the word having a great degree of relevance with the association-source word from among the words included in the program information of the results of provisional selection search. The search word is assumed to be included in associated words here, but it is also good to exclude the search word from the associated words.

The reason word extracting unit 111 extracts a word from the association dictionary stored in the association dictionary storage unit 103 using the association-source word extracted by the association-source word extracting unit 109, the associated words extracted by the associated word extracting unit 110, and the obtainment history information stored in the obtainment history storage unit 104, and determines the extracted word to be a reason word indicating the relationship between the association-source word and the associated word (Step S108). In the above example, the reason word extracting unit 111 determines the words "Variety", "Guest", "Talk", . . . each having a selection frequency equal to or greater than a predetermined threshold (for example, 10) to be the subjects to be processed, from among the words stored in the obtainment history storage unit 104 shown in FIG. 4. The reason word extracting unit 111 selects, as reason word candidates from among the subject words, the words each having both (i) a degree of relevance equal to or greater than a predetermined threshold (for example, 50) with the association-source word "Variety" extracted by the association-source word extracting unit 109 and (ii) a degree of relevance equal to or greater than a predetermined threshold (for example, 50) with the associated word "Taro Matsushita" extracted by the associated word extracting unit 110. Further, the reason word extracting unit 111 extracts the word having the greatest sum of the degree of relevance with the association-source word and the degree of relevance with the associated word as the reason word indicating the relationship between the association-source word "Variety" and the associated word "Taro Matsushita" from among the selected reason word candidates. More specifically, in the case where the degree of relevance between "Variety" and "Talk" is 80 and the degree of relevance between "Taro Matsushita" and "Talk" is 70, "Talk" has a degree of relevance equal to or greater than the threshold 50 with the association-source word and has a degree of relevance equal to or greater than the threshold 50 with the associated word, and thus "Variety" is a reason word candidate. Further, the sum of the degree of relevance (80) with the association-source word and the degree of relevance (70) with the associated word is 150. When the results of performing such calculation for all the words show that the sum 150 obtained by summing the degrees of relevance is the greatest value, "Talk" is determined to be the reason word. Likewise, the reason word extracting unit 111 further extracts a reason word indicating the relationship between the association-source word "Variety" and the associated word "Jiro Matsushita". As a result of the above, it is assumed that "Talk" is extracted as the reason word indicating the relationship between the association-source word "Variety" and the associated word "Taro Matsushita" and "Health" is extracted as the reason word indicating the relationship between the association-source word "Variety" and the associated word "Jiro Matsushita". In other words, the reason word extracting unit 111 can determine, to be a reason word, a word stored in the obtainment history information from among the words associated with both the association-source word and the associated word.

The display unit 107 displays, on the internal display device, the associated words extracted by the associated word extracting unit 110 and the reason words extracted by the reason word extracting unit 111 in addition to the program information of the search result programs which have already been displayed so as to present them to the user (Step S109). In the above example, FIG. 11 shows an exemplary display presented to the user. FIG. 11 shows a display of the associated words "Taro Matsushita" and "Jiro Matsushita" as (search result program-) related words which relate to the search word "Taro Matsushita". In addition, "Talk" is displayed as the reason word illustrating the relationship between the search word "Taro Matsushita" and the related word "Taro Matsushita", and "Health" is displayed as the reason word illustrating the relationship between the search word "Taro Matsushita" and the related word "Jiro Matsushita".

Further, in the case where an interested word is presented as an associated word (related word) when the user is not satisfied with the search results and the user inputs the interested word using the obtaining unit 101 (YES in Step S110, "one of the associated words" in Step S203 (for example, "Jiro Matsushita")), the interactive program search apparatus 100 repeats the above processing. On the other hand, in the case where the user enters a selected program using the obtaining unit 101 to watch the program (NO in Step S110, "desired program among search results"), a not-shown video reproducing apparatus reproduces the program selected by the user.

According to this Embodiment, the reason word reflecting the obtainment history information is presented when a related word is presented by means that the user provisionally selects a program from the search results. For this reason, it is possible to present a reason word which allows the user to easily understand the relationship between the program and the related word.

The interactive program search apparatus according to the present invention has been described based on the aforementioned Embodiment, but the present invention is not limited to the Embodiment.

In the Embodiment, the associated word extracting unit 110 extracts, as an associated word, a word having a degree of relevance equal to or greater than the predetermined threshold value with the association-source word extracted by the association-source word extracting unit 109 in the association dictionary stored in the association dictionary storage unit 103, from among the words included in the program information of the results of provisional selection search searched out by the provisional selection search unit 108. In addition to this, it is also good that the associated word extracting unit 110 obtains an associated word with reference to the obtainment history information stored in the obtainment history storage unit 104. For example, in the case where the results of provisional selection search searched out by the provisional selection search unit 108 are the programs with the program IDs "01", "10", and "03", the associated word extracting unit 110 determines, to be associated word candidates, the words each of which is included in the metadata of the programs with the program IDs "01", "10", and "03" and has a selection frequency equal to or greater than a predetermined threshold (for example, 10) from among the words stored in the obtainment history storage unit 104 shown in FIG. 4. The associated word extracting unit 110 may extract, as associated words, the words each having a degree of relevance equal to or greater than the predetermined threshold value with the association-source word extracted by the association-source word extracting unit 109, in the association dictionary stored in the association dictionary storage unit 103 shown in FIG. 3. This makes it possible to determine, to be the associated words, the words reflecting the user's inputs, selected programs, and user's preference. In other words, since the obtainment history information is taken into account at the time of extracting associated words, it is possible to extract the associated words which can be easily understood by the user.

In addition, in the Embodiment, the reason word extracting unit 111 extracts a word from the association dictionary stored in the association dictionary storage unit 103 using the association-source word extracted by the association-source word extracting unit 109, the associated word extracted by the associated word extracting unit 110, and the obtainment history information stored in the obtainment history information storage unit 104, and determines the extracted word to be the reason word indicating the relationship between the association-source word and the associated word. In addition to this, the reason word extracting unit 111 may determine, to be the reason word, the word which appears in programs greater in number than the programs in which the association-source word and the associated word appear, taking into account the number of programs in which the association-source word appears, the number of programs in which the associated word appears, and the numbers of programs in which the respective reason word candidates appear, with reference to the program information stored in the program information storage unit 102. This makes it possible to extract, as a reason word, a word having an appearance frequency greater than the appearance frequencies of the association-source word and the associated word in the program information, that is, a word that the user can easily hit upon, and present the user the reason word which can be understood more easily than the association-source word and the associated word.

In addition, in the Embodiment, the reason word extracting unit 111 determines, to be a reason word, only a word illustrating the relationship between the association-source word and the associated word, but it is also good to further present the user the association-source word as a reason word when the user selects a program and words related to the program are presented to the user. This allows the user to easily understand the focused word in the program in the case where associated words are presented.

In the Embodiment, the reason word extracting unit 111 presents the user only a single word as the reason word. However, the reason word extracting unit 111 may select plural words each having a degree of relevance equal to or greater than a predetermined threshold with the association-source word and a degree of relevance equal to or greater than a predetermined threshold with the associated word in a descending order of the magnitudes of the sums of the degree of relevance with the association-source word and the degree of relevance with the associated word by subjecting the words each having a selection frequency equal to or greater than the threshold value from among the words stored in the obtainment history storage unit 104, and extract the selected plural words as the reason words. FIG. 12 shows display contents in the case of plural reason words. For example, "Talk", "Guest", and "Comedy program" are displayed as the reason words of the related word "Taro Matsushita". Since plural reason words are presented in this way, the user can understand the reason why the associated words are presented more easily.

In addition, in the Embodiment, when the user enters the selected program using the obtaining unit 101 to watch the program, it is also good to discard the obtainment history information stored in the obtainment history storage unit 104. In this way, past selection history is deleted. This makes it possible to reflect the words and programs selected by the user after the start of the search on the results of the program search, association-source word extraction and reason word extraction more greatly.

In addition, in the Embodiment, related words are changed for each of the programs by means that the provisional selection search unit 108 extracts, for each of the provisionally selected programs, the results of provisional selection search and that the association-source word extracting unit 109 extracts an association-source word from each of the provisionally selected programs. Further, it is also possible to extract associated words for the search results as a whole by means that the association-source word extracting unit 109 determines an association-source word from the program information of all the programs searched out by the program search unit 105.

In addition, in the Embodiment, the obtainment history information stored in the obtainment history storage unit 104 is updated using the search word inputted by the user through the obtaining unit 101. Further, the obtainment history information may be updated using the program information of the program which is the association source of the program selected by the user to watch the program or the related words selected by the user. In other words, the obtaining unit 101 may be a processing unit configured to automatically obtain a search word from program information and update the obtainment history information stored in the obtainment history storage unit 104 using the obtained search word, instead of being configured with an input device such as keyboards, a mouse, a remote controller as mentioned above through which the search word is inputted by the user. More specifically, for example, when the user selects the program with the program ID "01" to watch the program, the obtaining unit 101 obtains, as the search words, the words "Taro Matsushita", "Variety", "Saburo Matsushita", "Japan", "Guest", and "Talk" included in the metadata of the program with the program ID "01". In the case where the search word is not included in the obtainment history information in the obtainment history storage unit 104, the obtaining unit 101 newly adds the value "1" as the selection frequency to the obtainment history information together with the word. On the other hand, in the case where the search word is included in the obtainment history information, the obtaining unit 101 updates the obtainment history information by adding 1 to the selection frequency of the search word. As an example, FIG. 13 shows obtainment history information obtained by updating the obtainment history information shown in FIG. 4 when the user selects the program with the program ID "01" to watch the program. As shown in FIG. 13, the selection frequencies of the words "Taro Matsushita", "Variety", "Saburo Matsushita", "Japan", "Guest", and "Talk" are incremented by 1 from the selection frequencies shown in FIG. 4. In this way, the obtainment history information is updated based on the program intentionally selected by the user. This makes it possible to adapt the obtainment history information to the user's preference more quickly than the case of using only a word selected by the user.

In addition, in the Embodiment, the reason word extracting unit 111 extracts a word from the association dictionary stored in the association dictionary storage unit 103, using the association-source word extracted by the association-source word extracting unit 109, the associated word extracted by the associated word extracting unit 110, and the obtainment history information stored in the obtainment history information storage unit 104, and determines the extracted word to be the reason word indicating the relationship between the association-source word and the associated word, but methods for determining reason words are not limited to this. For example, in the case where the association dictionary stored in the association dictionary storage unit 103 is a law-of-transition association dictionary which is configured to store words in an associative manner with consideration of the law of transition in the word relationship assuming that the words co-occurring in programs are related to each other, it is also good to include a program association dictionary which is configured to store related words in an associative manner assuming that the words co-occurring in programs more frequently are related to each other. In addition, the reason word extracting unit 111 may determine, to be reason words, the words stored in the obtainment history information from among the words each associated with both the association-source word and the associated word in the program association dictionary. Further, in the case where the association dictionary stored in the association dictionary storage unit 103 is a program association dictionary which stores related words in association with each other assuming that words frequently co-occurring in programs are related to each other, the reason word extracting unit 111 may determine the association-source word to be a reason word. Since the association-source word and the associated words are associated with each other through specific intervening words in the association dictionary based on a law of transition, it is possible to present the user the intervening word candidates as the reason words which are associated with the association-source word and the associated words when the user uses the program association dictionary. In addition, in the case of extracting the associated words based on the association-source word using the program association dictionary, since the association-source word and the associated words are directly associated with each other, it is possible to present the user the association-source word as the reason word which is associated with the associated words.

The present invention makes it possible to adaptively determine reason words according to user's preference, search actions, and watching actions in the case of presenting the user (i) search condition candidates for expanding or narrowing down search results using an association dictionary and (ii) reason words indicating the reason why the search condition candidates are presented. For this, the present invention is applicable to hard disc recorders, DVD recorders, TVs, audio components, terminals for performing information search accessing the Internet, and the like.

Conventionally, when related words are presented to a user, related words associated with an input word are simply displayed all together. For this, the user is required to select and input an appropriate word after considering the semantic distance between the related words and the input word or judging whether or not the presented related words are appropriate. In this invention, reason words to be presented are adaptively determined according to the user's preference and search history. Thus, the user understands the reason words indicating the relationship between the input word and the related words, and therefore the user can easily select the related words appropriate for the search purpose.

In addition, since the user can easily select the related words appropriate for the search purpose, the user can make accurate search for a desired information program.

The disclosed Embodiment is merely an example in terms of all aspects, and thus should not be considered to be limited. The scope of the present invention is indicated not by the above descriptions but by the Claims, and various modifications in terms of the matters equivalent to those in the Claims, and the like are intended to be included within the scope of the present invention.

Industrial Applicability

The present invention is applicable to, for example, an interactive program search apparatus which enables a user to search out a desired program by repeatedly selecting a word presented in association with a search program.

The invention claimed is:

1. An interactive program search apparatus which searches out a program using a search word, said apparatus comprising:
a program information storage unit configured to store program information indicating contents of programs on a per program basis;
an association dictionary storage unit configured to store an association dictionary which indicates an association and a degree of relevance between words included in the program information;
an obtaining unit configured to obtain the search word;
an obtainment history storage unit configured to store obtainment history information which includes the search word obtained by said obtaining unit and an obtainment frequency of the search word in association with each other;
a program search unit configured to search out programs from the program information using, as a search condition, the search word included in the obtainment history information;
an association-source word extracting unit configured to extract an association-source word which is associated with an associated word, based on the obtainment frequency included in the obtainment history information stored in said obtainment history storage unit, the association-source word being extracted from among the words included in the obtainment history information;
an associated word extracting unit configured to extract the associated word associated with the association-source word using the association dictionary;
a reason word extracting unit configured to extract, as a reason word indicating a relationship between the association-source word and the associated word, a word included in the obtainment history information from among words each having (i) a degree of relevance equal to or greater than a predetermined degree of relevance with the association-source word and (ii) a degree of relevance equal to or greater than a predetermined degree of relevance with the associated word; and
a display unit configured to display program search results which are the programs searched out by said program search unit, the associated word, and the reason word.

2. The interactive program search apparatus according to claim 1,
wherein said obtaining unit is configured to further obtain an instruction to provisionally select one of the program search results displayed on said display unit,
said interactive program search apparatus further comprises
a provisional selection search unit configured to search out one of the programs from the program information using program information of a provisionally selected program and the obtainment history information, and determine the searched-out program to be the provisionally selected program,
said association-source word extracting unit is configured to extract the association-source word, based on the obtainment history information and the program information of the provisionally selected program, and
said associated word extracting unit is configured to extract the associated word associated with the association-source word in the association dictionary, from among words included in the program information of the provisionally selected program.

3. The interactive program search apparatus according to claim 2,
wherein said association-source word extracting unit is configured to extract, as the association-source word, a word having a highest occurrence frequency in the obtainment history information among the words included in the program information of the provisionally selected program.

4. The interactive program search apparatus according to claim 2,
wherein said associated word extracting unit is configured to extract words associated with the association-source word in the association dictionary from among the words included in the program information of the provisionally selected program, and extract, as the associated word, a word included in the obtainment history information from among the extracted words.

5. The interactive program search apparatus according to claim 1,
wherein said reason word extracting unit is configured to extract words as reason word candidates from the association dictionary using the association-source word, the associated word, and the obtainment history information, and determine the reason word from among the extracted reason word candidates, based on the number of programs including the association-source word, the number of programs including the associated word, and the numbers of programs including the respective reason word candidates, the numbers of the programs being determined with reference to the program information stored in said program information storage unit.

6. The interactive program search apparatus according to claim 1,
wherein said reason word extracting unit is configured to determine the association-source word to be the reason word in the case where the association dictionary that said associated word extracting unit has used to extract the associated word is a program association dictionary in which words co-occurring in a program are stored in association with each other, and to extract the reason word from the program association dictionary using the association-source word, the associated word, and the obtainment history information in the case where the association dictionary that said associated word extracting unit has used to extract the associated word is a law-of-transition association dictionary generated with consideration of a law of transition in a relationship between words co-occurring in a program.

7. The interactive program search apparatus according to claim 1,
wherein said program search unit is configured to obtain, from the obtainment history information, occurrence frequencies of the respective words included in the program information of the program, calculate a sum of the obtained occurrence frequencies, and determine, to be a search result, a program having the sum of the occurrence frequencies equal to or greater than a predetermined threshold value.

8. The interactive program search apparatus according to claim 1,
wherein said obtainment history storage unit is configured to store, as the obtainment history information, either (i) words included in program information of a program watched by a user and a watching frequency of the program or (ii) words included in program information read by the user and a reading frequency of the program information.

9. An interactive program search method for searching out a program using a search word, said method being performed by a computer and comprising:
  obtaining the search word;
  searching out programs from program information which indicates contents of the programs on a per program basis and is stored in the program information storage unit, using obtainment history information which includes the search word obtained in said obtaining and an obtainment frequency of the search word in association with each other, the obtaining history information being stored in an obtainment history storage unit;
  extracting an association-source word which is associated with an associated word, based on the obtainment frequency included in the obtainment history information stored in said obtainment history storage unit, the association-source word being extracted from among words included in the obtainment history information;
  extracting the associated word associated with the association-source word, using the association dictionary which indicates an association and a degree of relevance between the words included in the program information, the association dictionary being stored in an association dictionary storage unit;
  extracting, as a reason word indicating a relationship between the association-source word and the associated word, the search word included in the obtainment history information from among words each having (i) a degree of relevance equal to or greater than a predetermined degree of relevance with the association-source word and (ii) a degree of relevance equal to or greater than a predetermined degree of relevance with the associated word; and
  displaying, on a display unit, program search results which are the programs searched out in said searching out, the associated word, and the reason word.

10. A non-transitory computer-readable recording medium having a program stored thereon for searching out a program using a search word, the program stored on said non-transitory computer-readable recording medium causing a computer to execute:
  obtaining the search word;
  searching out programs from program information which indicates contents of the programs on a per program basis and is stored in the program information storage unit, using obtainment history information which includes the search word obtained in the obtaining and an obtainment frequency of the search word in association with each other, the obtaining history information being stored in an obtainment history storage unit;
  extracting an association-source word which is associated with an associated word, based on the obtainment frequency included in the obtainment history information stored in said obtainment history storage unit, the association-source word being extracted from among the words included in the obtainment history information;
  extracting the associated word associated with the association-source word, using the association dictionary which indicates an association and a degree of relevance between the words included in the program information, the association dictionary being stored in an association dictionary storage unit;
  extracting, as a reason word indicating a relationship between the association-source word and the associated word, the search word included in the obtainment history information from among words each having (i) a degree of relevance equal to or greater than a predetermined degree of relevance with the association-source word and (ii) a degree of relevance equal to or greater than a predetermined degree of relevance with the associated word; and
  displaying, on a display unit, program search results which are the programs searched out in the searching out, the associated word, and the reason word.

\* \* \* \* \*